Oct. 31, 1967  M. E. LARKIN  3,349,792
TAPPING T AND VALVE

Filed Feb. 24, 1965  3 Sheets-Sheet 1

INVENTOR
M. E. LARKIN
BY
ATTORNEYS

Oct. 31, 1967

M. E. LARKIN 3,349,792

TAPPING T AND VALVE

Filed Feb. 24, 1965

INVENTOR
M. E. LARKIN
BY
ATTORNEYS

Oct. 31, 1967

M. E. LARKIN 3,349,792

TAPPING T AND VALVE

Filed Feb. 24, 1965

INVENTOR
M.E. LARKIN

BY

ATTORNEYS

United States Patent Office 3,349,792
Patented Oct. 31, 1967

3,349,792
TAPPING T AND VALVE
Mark E. Larkin, Bartlesville, Okla., assignor to Phillips Petroleum Company, a corporation of Delaware
Filed Feb. 24, 1965, Ser. No. 434,946
5 Claims. (Cl. 137—318)

ABSTRACT OF THE DISCLOSURE

A tapping T for tapping plastic gas mains in which the body of the T is fixed to the plastic pipe by means of a cutter element which cuts a coupon from the pipe, the cutter element being fastened to the T.

---

Figure 1:
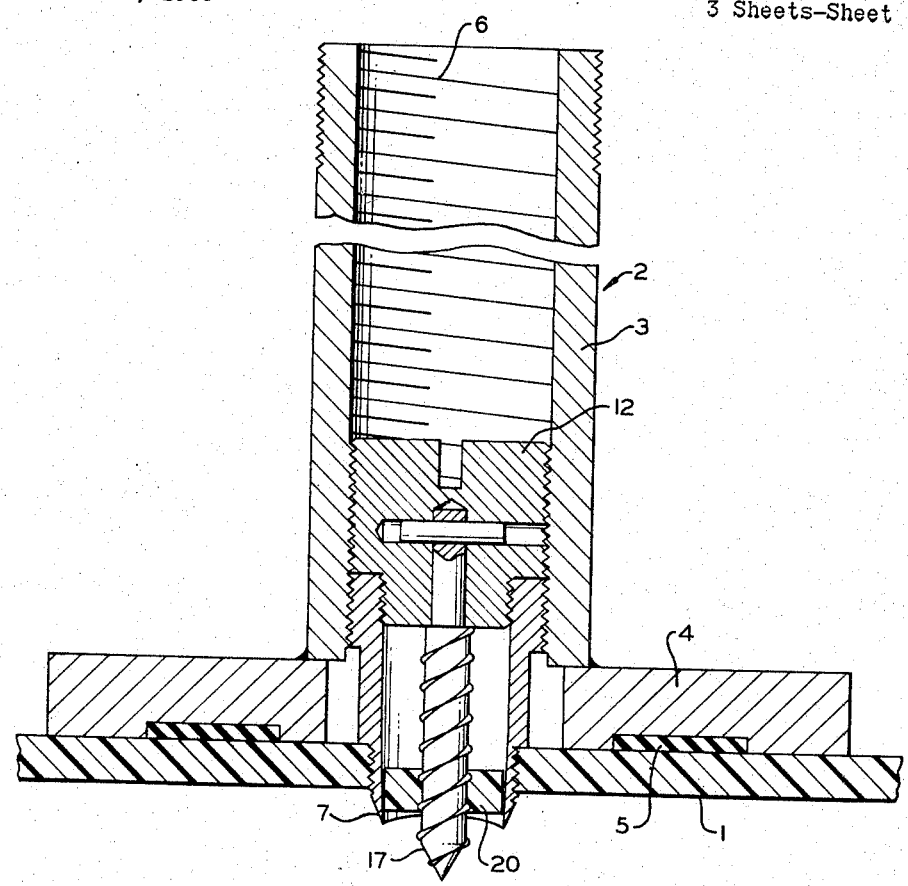

This invention relates to service T's for tapping plastic gas mains. In one of its aspects, it relates to a service T for tapping plastic gas mains having a valve in the lateral bore of the T which engages a cutter element which cuts a coupon from the plastic main, the cutter element serving the function of fixing the T body to the gas main. In another of its aspects, the invention relates to a service T for tapping plastic gas mains having a valve which has a means for engaging a cut coupon from a plastic gas main and removing the same from the main.

Plastic mains for gas distribution are coming into wide use. They are used more and more with higher pressure. In order to tap a main to provide service for dwellings and the like, a tapping T is used. The T cuts a hole in the main and is fixed to the outside of the main to draw fluid therefrom.

Such a T must fit tightly on the pipe so that no fluid escapes to the atmosphere. With the use of higher pressures, the requirements of the T become greater. Fluid escape from the junction of the T and the main can be caused by shifting of the T on the pipe and deformation of the pipe in the area of the tap. A further requirement of the T is that the plastic material cut from the pipe must be removed so that plastic cuttings do not clog valves in associated equipment downstream from the tap.

Many types of T's have been proposed for tapping plastic gas mains. Most of these T's have been unsuitable for one reason or another, the major objection being leakage of fluid and/or clogging of gas mains due to cuttings falling thereinto. One type of T and valve which has been proposed employs a circular band cutter on a valve which is positioned in the bore of the T. The valve also contains a screw which engages a coupon cut out by the circular band. Such a tapping T requires that the T be first welded to the pipe. If solvent welding is used, the operator must wait until the T body is sufficiently set on the pipe before he begins the tapping operation. Further, the area around the hole may sink, causing the weld band to break and the T to slip.

I have now found that a tapping T can be made to be more stationary, fluid tight without welding, by using a band cutter which threads the hole as it cuts through the pipe and engages the T body to hold the same against the pipe.

It is, therefore, an object of this invention to provide a T for tapping plastic gas mains.

It is a further object of this invention to provide a tapping T which removes the cutting from the pipe. It is a further object of this invention to provide a valve which can be placed between a gas main and a lateral to a gas main.

It is a further object of this invention to provide a tapping T which will not slide laterally after it is fixed in place. It is a further object of this invention to provide a tapping T which prevents leakage of fluid between the tapping T and the gas main. It is a still further object of this invention to provide a tapping T which prevents sinking of the hole or plastic deformation of the area around the tapped hole.

It is a further object of this invention to provide a tapping T which is self-engaging to the pipe and does not require welding.

Other aspects, objects and the several advantages of this invention are apparent to one skilled in the art from a study of this disclosure, the drawings and the appended claims.

According to the invention, there is provided a tapping T which removes a segment from a pipe, fixes the T to the pipe so firmly without welding that gas escape will be minimized and so that the T will not slide on the pipe. The T contains a body shaft which is adapted to fit a portion of the way around the pipe, a valve containing a screw which engages the coupon to be cut from the pipe, and a band cutter element which is engaged by the valve, which cuts the pipe and fixes the T in place over the hole.

Figure 2:
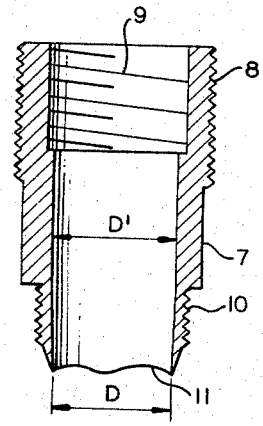
Figure 3:
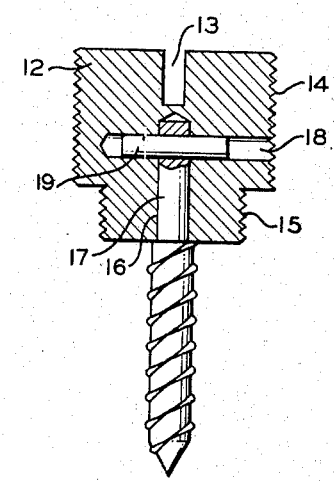
Figure 4:
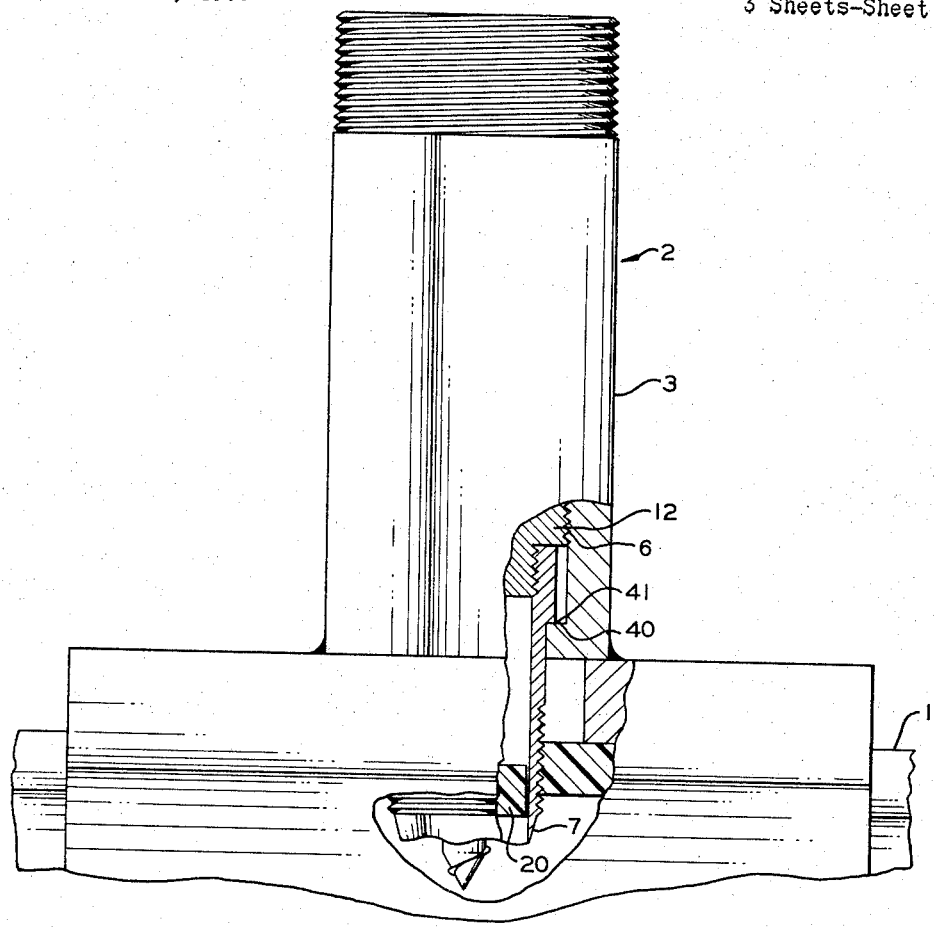
Figure 5:
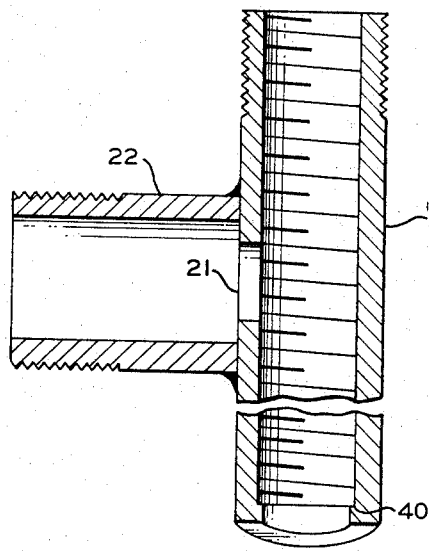
Figure 6:
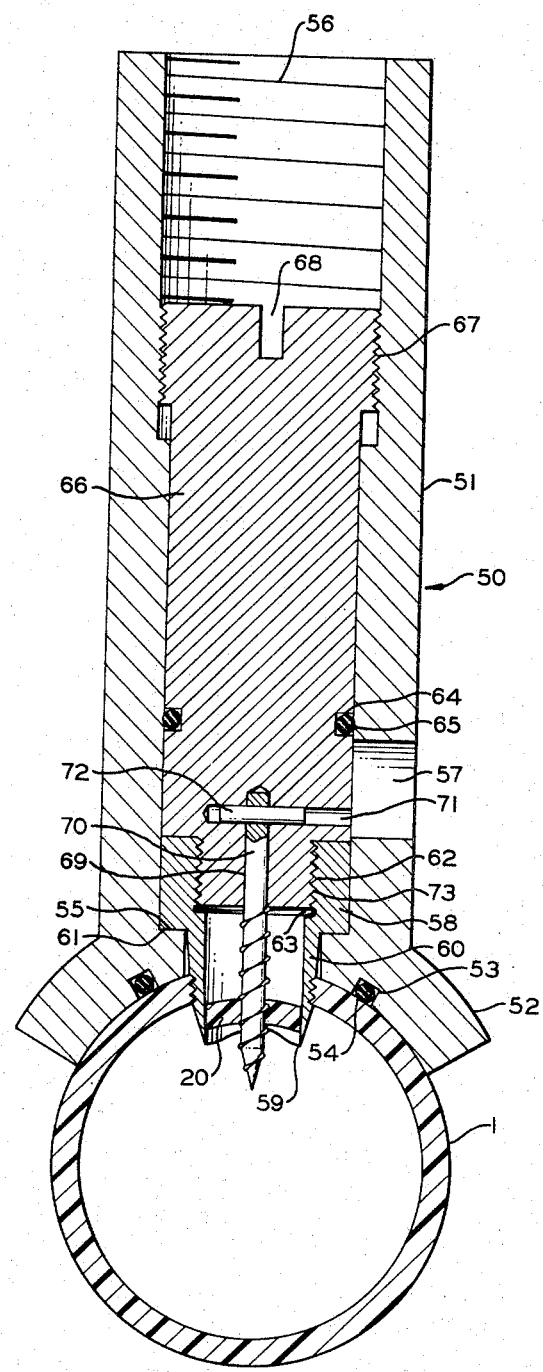

The invention can be best understood by reference to the accompanying drawings, of which FIGURE 1 is a cross section through one embodiment of the invention showing the T valve and cutter in assembled form on a pipe; FIGURE 2 is a cross section through the self-tapping cutter according to the invention; FIGURE 3 is a cross section through a suitable valve, as shown in FIGURE 1, FIGURE 4 is a cross section through a tapping T which shows another embodiment of the invention; FIGURE 5 is a cross section showing the lateral bore and valve shaft of FIGURE 4; and FIGURE 6 is a cross section taken across a pipe and tapping T, showing still another embodiment of the invention.

Referring now to FIGURES 1–3, a tapping T comprising a plastic pipe 1 has placed on it a valve body 2 having a split collar portion 4 which conforms to the shape of the pipe and an upstanding elongated hollow conduit or valve shaft 3. Collar 4 has a recessed area which surrounds the central hole into which sealing elements 5 are placed. The sealing elements can be O-rings, gaskets and the like which prevent fluid from passing therethrough when pressure is applied between the collar 4 and pipe 1. The body 2 can be made of any suitable material, such as plastic or metal and can be made in one or two pieces. In this embodiment of the invention, it is preferred that valve shaft 3 and collar 4 are made of a metal, such as steel or copper, and are welded or brazed together. The inner bore of valve shaft 3 is threaded and is threadably engaged to cutter 7 and valve 12. Cutter 7 with the configuration of an annular cylinder has in the upper, outer portion threads 8 for engaging threads 6 on the inner bore of valve shaft 3. Also provided in the upper portion of cutter 7 are threads 9 on the inner portion of cutter 7. The lower portion of cutter 7 has blades 11 which form a wavy, circular band. The blades are sharpened along the entire periphery. Threads 10 are provided on the outer, lower portion of cutter 7 for engaging and threading pipe 1. Valve 12 is provided with a screwdriver slot 13 for turning the valve when it is in the valve shaft, as herein shown in FIGURE 1. It is obvious that other means for turning the valve can be provided in the top of valve 12. For example, a square-shaped hole could be provided with a key for turning the valve. The valve 12 has threads 14 on the outer portion thereof for engaging threads 6 in the inner portion of valve shaft 3. Threads 15 are located on a recessed lower portion of valve 12 for engaging threads 9 of cutter 7. A recess 16 is provided to house threaded rod 17. The threaded rod can be a modified woodscrew. A recess 18 is provided for rod pin 19 which anchors shaft 17 to prevent relative movement of shaft 17 with respect to valve 12. Shaft 17 can also be secured to valve 12 by soldering or welding. As can be seen from FIGURE 1, rod 17 pierces coupon 20 which is cut from pipe 1. The inner diameter of cutter 7 is slightly tapered inwardly from the top to the bottom of the element so that coupon 20 can be easily removed. As seen in FIGURE 2, D is less than D'. The taper is only slight, the line of taper making an angle with the vertical of two degrees, for example.

In operation, the body 2 is placed on pipe 1 in the desired position. Cutter element 7 is then screwed into the inner bore of valve shaft 3. Valve 12 is then screwed into the valve shaft 3 and into cutter 7. Both the valve 12 and cutter 7 are screwed downwardly until the rod 17 contacts the outer surface of the pipe 1, the cutter element 7 being actuated by the turning of valve 12. As valve 12 continues to be turned, screw 17 will pierce the pipe and be attached thereto. As the turning continues, cutter element 7 will begin cutting into the pipe, the area having been fixed by screw 17. As the cutting continues, the screw 17 will hold the coupon in place as the cutter element 7 bears down on the pipe, thus preventing any downward deformation of the pipe due to the force of cutting element 7. After the coupon 20 has been severed from pipe 1, the cutter element 7 will be threadably engaged with pipe 1 on the lower end and with body 2 on the upper end. Threads 10 are coarser than threads 8. Thus, the downward movement of cutter 7 creates a pulling action on pipe 1, eliminating "dishing" of pipe 1 and providing a better seal between pipe 1 and sealing element 5. The turning motion of valve 12 is reversed and valve 12 is moved upwardly, bringing with it coupon 20 and leaving in place cutter 7. The pipe 1 is now tapped, the T is fixed in place, and ready for operation. The combination of valve 12 and coupon 20 can be used to admit or prevent fluid flow from pipe 1 through the T. As a practical matter, it may be desirable to hold the tapping T in place on the pipe, during the cutting operation and afterward, by clamps which can be attached to either side of collar 4 extending around the circumference of the pipe.

Referring now to FIGURE 4, a second embodiment of the invention is shown. In this embodiment, valve shaft 3 has inwardly extending shoulder 40 on the lower end. This shoulder 40 contacts outwardly extending, annular shoulder 41 of cutter element 7. In this embodiment of the invention, there are no threads on the upper, outer portion of cutter element 7 to engage threads 6 in valve shaft 3. In operation, as the cutter elements cuts through pipe 1 and is fastened in place on the pipe, shoulder 41 of cutter element 7 bear down on shoulder 40 of valve shaft 3, thus firmly fixing the valve body onto pipe 1. As seen in FIGURE 5, valve shaft 3 has lateral opening 21 to which is attached pipe 22, used for production purposes. The valve shaft 3 of FIGURE 1 will have a similar lateral opening for fluid flow.

In FIGURE 6, a tapping T is shown in which the body and valve are made of thermoplastic material. In this embodiment of the invention, body 50 having valve shaft 51 and collar portion 52 are made of one piece. The thermoplastic used can be any suitable thermoplastic material, such as polyethylene, polypropylene, polybutene and copolymers thereof. The preferred thermoplastic material for this embodiment of the invention is high density polyethylene, such as that produced in Patent 2,825,721, issued Mar. 4, 1958 to Messrs. Hogan and Banks. Collar 52 has a groove 53 which is concentric with the central hole in valve shaft 51 and adapted to house an O ring 54 which, when pressure is applied between collar 52 and pipe 1, will effectively seal the area therebetween to prevent fluid loss. In the lower portion of valve shaft 51, there is provided an annular shoulder 55 for engaging annular shoulder 61 of cutter element 58. The upper portion of valve shaft 51 has threads 56 extending at least a portion of the way from the top to the bottom of the shaft. These threads engage threads 67 in valve 66. Valve shaft 51 is also provided with outlet 57. Cutter element, having an inner threaded portion 62 to engage threads 73 on the lower recessed portion of valve 66. Cutter 58 has at the bottom portion cutter elements 59 which cut a coupon 20 from pipe 1 and threads 60 which engage pipe 1 during and after the cutting operation. In this embodiment of the invention, the cutter element is preferably made of a metal, such as a medium carbon steel, which can be sharpened to cut through pipe 1. Valve 66 is provided with a means 68 for turning the same. In this embodiment of the invention, a screwdriver slot is shown. Circular recess 64 has positioned in it sealing ring 65 to effectively seal the bottom shaft of the T from fluid loss. The bottom portion of valve 66 has recess 69 for housing threaded rod or screw 70 which is anchored by driving pin 72 positioned in recess 71. As can be seen from the drawing, screw 70 engages coupon 20 before and during the cutting operation. In operation, valve 66 screws into cutter element 58 which is positioned in the valve shaft 51. Screw 70 engages pipe 1 before cutter element 58 begins cutting the pipe. As cutting proceeds, screw 70 holds the pipe in place. After coupon 20 has been severed from pipe 1, cutter element 58 will be threaded and fastened in place on the pipe by virtue of threads 60 on the bottom thereof and will hold tapping T tightly drawn against the pipe by engagement of shoulder 61 of the cutter element with annular shoulder 55 of T body 50. When the valve is withdrawn, the coupon 20 will be removed from the pipe and the cutter element 58 will remain in place, thus holding the valve body 50 tightly against pipe 1. In case pressure need be shut off to lateral, valve 66 can be screwed back into cutter 58. As a practical consideration, a resilient gasket can be used for a more effective seal between valve 66 and cutter 58. Similarly, resilient gaskets can be provided between valve 12 and cutter 7, between cutter 7 and shoulder 41 of shaft 3 (FIGURE 4), and between shoulder 61 of cutter 58 and shoulder 55 of valve shaft 51 (FIGURE 6).

Valve 66, like body 50, can be made of any suitable thermoplastic material. Examples of such thermoplastic materials which can be used for valve 66, as well as any other thermoplastic parts of the various embodiments, include polyethylene, polypropylene, polybutene, and copolymers thereof, polystyrene, polyvinyl alcohol, polyvinyl chloride, and the like.

It is obvious to one skilled in the art that while the invention disclosed is generally for use on plastic gas mains, it is in the scope of the invention to use the invention on any conduit which can be penetrated by a cutter element and a screw. For example, a conduit which is square-shaped in cross section could be tapped with the apparatus of the invention merely by adapting the collar portion to fit the shape of the conduit.

Reasonable variation and modification are possible within the scope of the foregoing disclosure, the drawings and the appended claims to the invention, the essence of which is that a tapping T for tapping plastic gas mains is provided; in said tapping T, a body of the T is fixed to a plastic pipe by means of a cutter element which cuts through the pipe, thus fastening the cutter element to the pipe engaging the T body and holding the same against the pipe; and in said tapping T, a valve element actuates the cutter element to cut the pipe, thereafter removes a cut coupon from the pipe, and serves as a regulator of fluid passing through the T.

I claim:
1. A service T for tapping plastic pipe comprising
   (a) a body having
      (1) an elongated hollow conduit, a portion of the inner surface of which is threaded, said elongated hollow conduit having an outlet opening in a lateral surface thereof,
      (2) a collar portion being arc-shaped in cross section and adapted to fit over a portion of said plastic pipe, said collar portion having an open- ing in communication with the axial opening of said elongated hollow conduit,
(b) an annular cylinder in said elongated hollow conduit having at the lower end thereof a means for cutting a circular coupon from said plastic pipe to leave a circular hole in said plastic pipe,
   (1) a means on said annular cylinder for fastening said annular cylinder to the cut wall portion of said hole in said plastic pipe,
   (2) means on said annular cylinder for fastening said body of (a) to said annular cylinder to hold said collar portion of (a)(2) in sealable contact with said plastic pipe,
(c) a valve being threadably engageable with said inner threaded surface of said elongated hollow conduit and having
   (1) means for engaging said coupon cut from said plastic pipe by said cutting means.

2. A service T for tapping plastic pipe according to claim 1 wherein the inner diameter of said annular cylinder is tapered at least a portion of the way down to said means for cutting said circular coupon so that said cut coupon can be withdrawn upwardly through the annular cylinder without frictional engagement with the upper portion of said annular cylinder.

3. A service T for tapping plastic pipe according to claim 1 wherein said annular cylinder threadably engages the inner surface of said elongated hollow conduit.

4. A service T for tapping a plastic pipe according to claim 1 wherein said fastening means of (b)(2) comprises an annular outwardly extending shoulder on the upper portion of said annular cylinder which shoulder engages an inwardly extending opposing annular shoulder on said elongated hollow conduit, thereby holding said body in sealed engagement with said plastic pipe.

5. A service T for tapping plastic gas mains according to claim 4 wherein said body is a one piece molded continuum of thermoplastic material which contains a sealing ring concentric with said opening in said collar portion in communication with said axial opening of said hollow pipe, said sealing ring adapted to seal the surface between said collar and said pipe.

References Cited
UNITED STATES PATENTS

| | | | |
|---|---|---|---|
| 2,839,075 | 6/1958 | Mueller | 137—318 |
| 2,983,477 | 5/1961 | Merrill | 137—318 X |
| 3,176,708 | 4/1965 | Shields | 137—318 X |

WILLIAM F. O'DEA, *Primary Examiner.*

D. R. MATTHEWS, *Assistant Examiner.*